United States Patent [19]
Anthony

[11] 4,215,454
[45] Aug. 5, 1980

[54] ATTACHING FIN MATERIAL TO A HEAT TRANSFER OR LIKE SURFACE

[75] Inventor: Robert E. Anthony, Mount Blanchard, Ohio

[73] Assignee: United Aircraft Products, Inc., Dayton, Ohio

[21] Appl. No.: 894,403

[22] Filed: Apr. 7, 1978

[51] Int. Cl.² ............... B21D 53/04; B23P 15/26
[52] U.S. Cl. .................. 29/157.3 R; 29/157.3 AH; 113/118 A
[58] Field of Search ............ 165/183 US; 113/118 B, 113/118 A; 29/157.3 AH, 157.3 A, 157.3 B, 157.3 R

[56] References Cited

U.S. PATENT DOCUMENTS

| | | | |
|---|---|---|---|
| 817,938 | 4/1906 | Stolp et al. | 113/118 A |
| 1,584,772 | 5/1926 | Hyde | 29/157.3 AH |
| 1,821,434 | 9/1931 | Hamilton | 165/183 X |
| 1,840,317 | 1/1932 | Horvath | 29/157.3 AH |
| 1,997,197 | 4/1935 | Nigro | 29/157.3 AH |
| 2,609,068 | 9/1952 | Pajak | 29/157.3 R |
| 2,778,610 | 1/1957 | Bruegger | 29/157.3 R |
| 3,022,230 | 2/1962 | Fialkoff | 29/157.3 R |
| 3,217,798 | 11/1965 | Renzi | 29/157.3 R |
| 3,636,607 | 1/1972 | DeMarco | 29/157.3 R |
| 4,085,491 | 4/1978 | Mathwig | 29/157.3 AH |

FOREIGN PATENT DOCUMENTS

| | | | |
|---|---|---|---|
| 573723 | 3/1924 | France | 29/157.3 AH |
| 756854 | 10/1933 | France | 113/118 A |
| 988026 | 4/1951 | France | 29/157.3 AH |

Primary Examiner—Milton S. Mehr
Attorney, Agent, or Firm—J. E. Beringer

[57] ABSTRACT

A heat transfer or like surface has fins attached thereto in a disconnected, spaced apart, substantially parallel relation, the fins standing upright on edge on the surface. A method of producing and attaching the fins has particular utility in the presence of a curved mounting surface, the fins being formed to allow them to be bent in conformance with the curved surface. Apparatus including an adjustable roller mechanism and a braze fixture are useful in forming and attaching the fin material.

13 Claims, 11 Drawing Figures

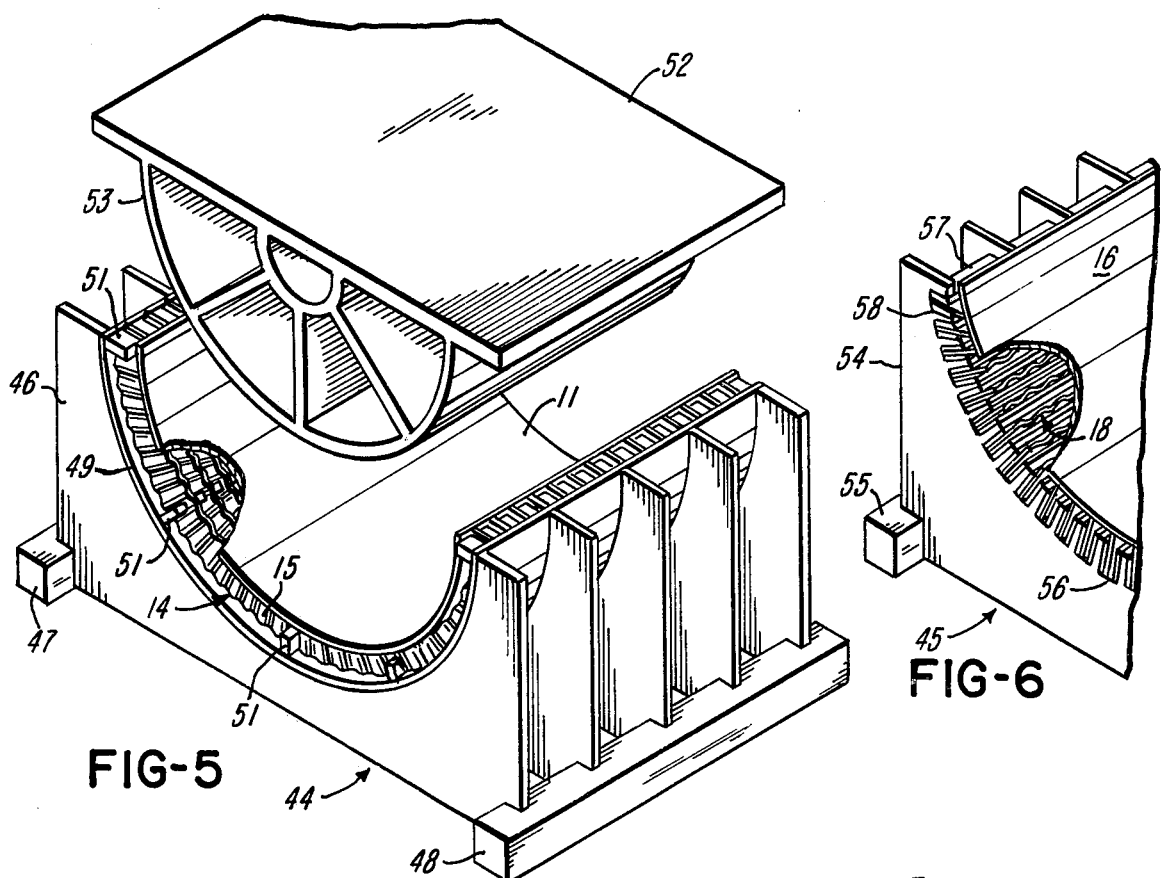
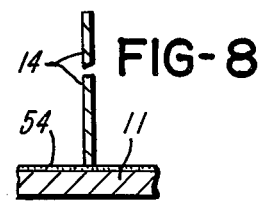
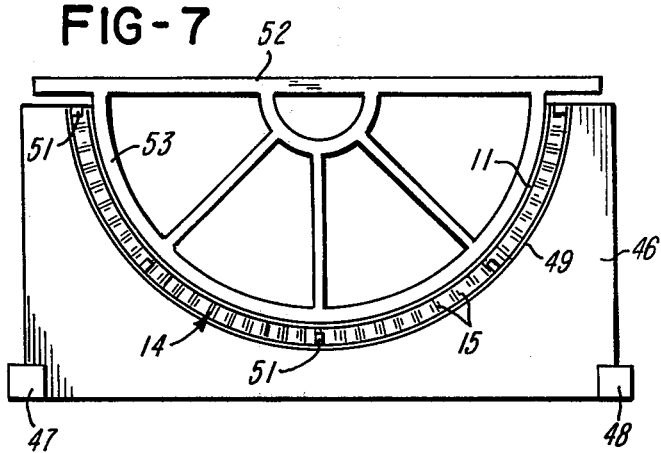
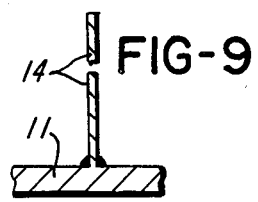
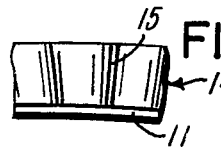
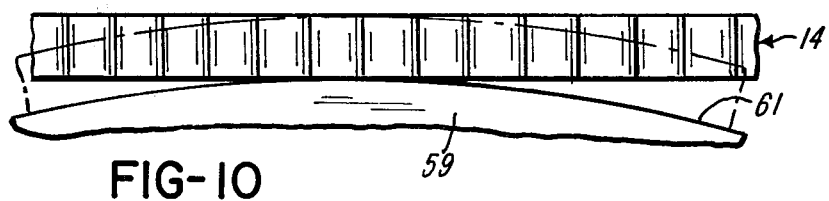

ATTACHING FIN MATERIAL TO A HEAT TRANSFER OR LIKE SURFACE

BACKGROUND OF THE INVENTION

1. Field of the Invention

This invention relates to finned heat transfer and like surfaces, and particularly to methods of making and of attaching fin-like material to parent surfaces. A parent surface may have fin-like material attached thereto for reinforcement and other purposes. For disclosure purposes, however, the invention will be considered as dealing with problems of providing extended surface fins to a heat transfer surface, especially a curved heat transfer surface.

2. Description of the Prior Art

A heat conductive part separating flowing fluids of different temperature will sometimes be provided with fins which extend outwardly into the flow path of either one or both fluids. The fins improve heat transfer efficiency. Where the thickness and machinability of the part permits, a surface thereof can be milled with multiple, parallel slots to form the desired fins. This is a relatively expensive operation, and, as indicated, is unavailable when the part is made of a relatively thin sheet metal or the like. In another method, a strip of a fin material is superimposed on and brazed to the heat transfer surface, the strip being an accordion-like part comprised of multiple connected corrugations. Since fluid flow cannot conveniently take place transversely of the corrugations, the strip is oriented so that fluid flow occurs longitudinally of or lengthwise of the strip. Although this method produces a finned heat transfer surface it may be undesirable as imposing an excessive pressure drop, or as adding excess weight. It has, in any event, a specific disadvantage in that the strip cannot be bent to conform to a surface curved in the direction of fluid flow. That is, a corrugated fin strip is readily flexible and easily bent about an axis parallel to the corrugations but is essentially rigid as against, and strongly resistant to, bending forces applied in a transverse sense.

SUMMARY OF THE INVENTION

In a method according to the disclosed manner of practice of the invention, extended surface heat transfer material is provided in the form of single, disconnected fin strips made of a deformable, heat conductive material. Multiple fin strips are mounted on edge on a parent surface in a substantially parallel, spaced apart relation, the strips orienting so that the flow of fluid over the parent surface is in a sense longitudinally of the strip. Individual fin strips are pre-formed, each to have a longitudinal series of transverse undulations. If the strip is to be applied to follow a curved surface, it is further bent about a transverse axis so that a lower edge thereof assumes a concave configuration matching the convex curvilinear shape of the parent mounting surface. Strip undulations expand and compress at opposite ends thereof to accommodate bending stresses. Formed strips are placed on edge on the parent mounting surface, parts being assembled in a braze fixture which holds the strips in an upright position and applies a pressure urging the lower strip edges into close intimate contact with the mounting surface. While these conditions are maintained, a brazing operation is conducted resulting in a bonding of the fin strips to the mounting surface along the strip lower edges. Apparatus useful in the practice of the invention includes, in addition to the braze fixture, a roller mechanism through which strip material is advanced to produce undulations therein. The roller mechanism is settable to bend the strip about an axis perpendicular to its plane simultaneously with formation of the undulations therein. This may be regarded as an optional step of the invention, since the strip material can, if desired, be bent over a form after it has been put through the roller mechanism. The undulated form of the fin strips has a dual effect. It induces turbulence in the flowing fluid, and thereby heightens the heat transfer effect, and also provides indentations in the strip material facilitating a bending of the strip to an arcuate shape about a longitudinal edge thereof.

As compared to prior art constructions and techniques, therefore, the instant invention provides a finned heat transfer surface obviating problems of weight and pressure drop. It provides, additionally, for a relatively inexpensive attaching of fins to a curved heat transfer surface and therefore for improved heat transfer effects as between fluids one of which flows in contact with such surface.

An object of the invention is to provide a finned surface and a method of making thereof substantially as is set out in the foregoing.

Other objects and details of invention steps and apparatus will appear from the following description, when read in connection with the accompanying drawings, wherein:

FIG. 5 is a view in exploded perspective of a braze fixture useful in holding parts as in the embodiment of FIG. 1 for brazing;

FIG. 6 is a fragmentary view similar to FIG. 5, showing parts held to produce an embodiment as in FIG. 2;

FIG. 7 is an end view of the braze fixture of FIG. 5, upper and lower fixture portions being in a cooperative relation;

FIG. 8 is a detail, fragmentary view showing a fin mounted for brazing on a clad heat transfer surface, prior to brazing;

FIG. 9 is a view like FIG. 8, showing the parts as they appear after brazing;

FIG. 10 is a view showing an alternate manner of bending a fin strip to produce an arcuate configuration therein; and FIG. 11 is a detail view of a stretched fin portion.

Figure 1:
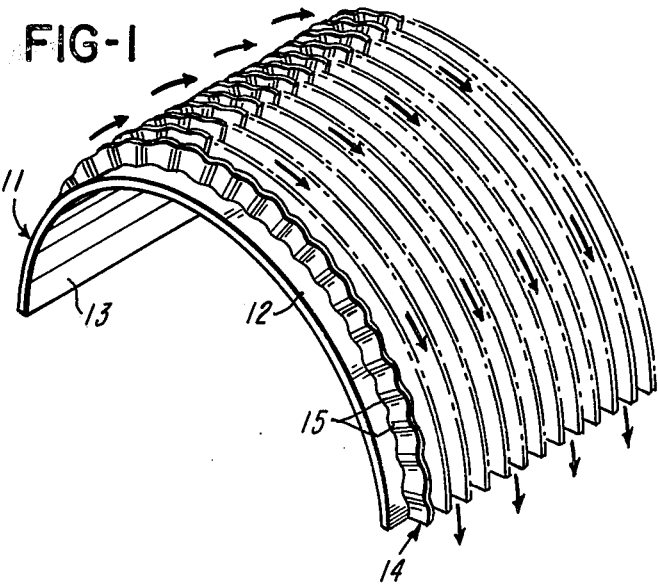
FIG. 1 is a view in perspective, partly broken away, of a curved, finned heat transfer surface in accordance with an illustrated invention embodiment, the fins extending in a sense longitudinally of the curved surface.

Referring to the drawings, a finned heat transfer part as contemplated by and as produced by the present invention is shown in exemplary form in FIG. 1. A part 11 is, in the illustrated instance, made of a relatively thin sheet material, for example aluminum or an aluminum alloy. A particular aspect of the invention deals with an attaching of fins to a curved surface. Accordingly, part 11 is shown as having an arcuate configuration providing an upper, convex surface 12 and an under or concave surface 13. The part may be an element of any structural member, for example a conduit, in which fluids of different temperature are in contact respectively with surfaces 12 and 13, which may be described as heat transfer surfaces, heat being rejected through the part from the fluid of higher temperature to the fluid of lower temperature. Fluid in contact with upper surface 12 is considered as being in motion, the direction of flow being in the direction of curvature of the contacted surface. Upstanding from the surface 12, and metallurgically bonded thereto as will hereinafter more clearly appear, are fins 14. The fins are made of a heat conductive material which may be the same as or compatible with the material of part 11. In projecting upwardly from surface 11, into a stream of gas or liquid flowing over that surface, the fins effectively extend surface 11 providing additional, secondary heat transfer surface. The fins contribute distinct, measurable improvement in the rate of heat transfer between fluids separated by part 11. As seen, the fins are disconnected, strip-like elements which, as installed on part 11, occupy positions in a substantially parallel, spaced apart relation to one another. They are plastically deformable and have bent configurations (to be discussed later in more detail), and, as installed, have a longitudinal extent which conforms to or follows the direction of curvature of surface 12. Accordingly, between them, the fins 14 define fluid flow channels, fluid directed over surface 12 moving relatively freely through the defined channels making simultaneous contact with surface 12 and with upstanding fins 14. The fins have a wave-like form in that they are further bent to have a longitudinal series of transverse undulations 15. These project into defined flow channels, on opposite sides of respective fins, and contribute to a turbulence in the flowing fluid bringing it into extensive, repeated contact with fin surfaces.

The fluid flowing over surface 12 in contact with fins 14 may be confined or a relatively unconfined fluid. In this connection, it will be understood that there may be super-imposed over the fins another part like the part 11, which other part contacts upper edges of fins 14 to form a closed passage for flow of a confined fluid. It may additionally be noted that fins 14 have a reinforcement effect in that their presence strengthens the resistance of part 11 to longitudinally applied bending forces. Obviously, structural principles involved are useful in the making of strong, light weight construction panels and the like as a concept additional to that of producing secondary surface heat transfer material. In an embodiment not here illustrated, it will be evident that bent fins like the fins 15 could be attached to nest within a concave surface, as for example the surface 13 on the underside of part 11.

Figure 2:
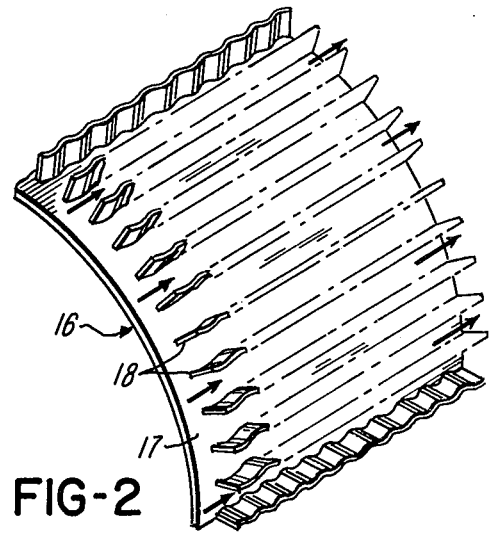
FIG. 2 is a view similar to FIG. 1, in fragmentary form, showing a curved finned heat transfer surface in which the fins extend in a sense transversely of the curved surface.

In a form of article as shown in FIG. 2, a heat transfer part 16 like the part 11 is oriented so that the direction of fluid flow over a convex surface 17 is transversely of the direction of curvature of that surface. Fins 18, constructed like and corresponding to fins 14, mount on edge on surface 17, and, like fins 14, appear in a disconnected, substantially parallel, spaced apart relation. In this connection, however, since the fins orient in the sense of fluid flow they position transversely of the direction of curvature of the part. They are not required to be bent about transverse axes, therefore, and retain an essentially straight strip-like configuration. In the event of use of a flat, uncurved part like the parts 11 or 16, straight fins 18 may be mounted thereon in correspondence with the direction of fluid flow over the surface to which they are attached.

In a manufacture of an article according to FIG. 1 or FIG. 2, according to the present invention embodiment, a parent or base part is provided which may be flat or which may be configured to present a fin mounting surface curved in one or plural senses. In the illustrated example of FIG. 1, a part 11, made of sheet aluminum or like brazeable metal, is shaped to the arcuate form shown. Flat, strip material 19, from which fins 14 are to be formed, is fed between a pair of cooperating rollers 21 and 22 which effect a plastic deformation of the material of the strip, forming the undulations 15 therein. Issuing strip material is transformed thereby into a continuous fin 14, and, in an appropriate ensuing operation, the fin is cut to desired lengths. Rollers 21 and 22 are part of a roller mechanism which includes a relatively heavy support 23. The support 23 has a central through opening 24 defined by support side walls 25 and 26 and interconnecting top and bottom walls 27 and 28. There is, in addition, a short back wall 29. Carried between the side walls 25 and 26, on a transversely mounted shaft or bolt 31, is a bearing block 32, the arrangement being one to provide for a relative tilting motion of the block about shaft 31 as a pivot. In a front face of the block 32 is a bearing recess receiving one end of a shaft 33, the other end of which shaft projects relatively to the block and has roller 21 keyed thereto. Roller 22 positions immediately below roller 21 and is keyed to a shaft 34. The latter extends to and through a bearing block 35 carried between support walls 25–26, and projects through and beyond such bearing block to what may be regarded as the rear of the support. There it is connected, in a manner not here shown, to a power source from which the shaft may be rotatively driven. The bearing block 35 has a dovetail or like sliding engagement (not shown) with walls 25–26 as a result of which it is precluded from relative tilting motion in the support but is permitted and guided in motion in a vertical sense taking it toward and away from bearing block 32. As will be obvious, a result of vertical relative motion of the bearing block 35 is to move roller 22 in approaching and withdrawing senses relatively to roller 21. The rollers 21 and 22 are substantially identical, each having on its periphery a continuous series of circumferentially spaced apart rounded teeth 36. The teeth 36 on the respective rollers are adapted to interfit as a result of which a positive rotary drive of roller 22 effects a simultaneous rotary movement of roller 21, the latter effectively idling within bearing block 32. In advancing strip material 19 between the rollers 21 and 22, the material thereof is engaged and plastically deformed by interfitting teeth 36. An operation of the rollers 21 and 22, therefore, in the presence of strip material 19, effects a positive feed of the strip material through the roller mechanism in the course of which the strip is given a wave-like, undulating configuration substantially as shown.

Controls for the roller mechanism include a means by which bearing block 35 may be moved to and held in selected positions of vertical adjustment, and roller 22 adjusted thereby relatively to roller 21. Thus, bearing block 35 has a vertically elongated through slot 37. A bolt 38 extends longitudinally through slot 37 and has a shank end in screw threaded engagement in back wall 29 of the support. An outer end of the bolt projects outside of slot 37 to the front of bearing block 35 where it is formed with an enlarged head 39. As will be evident, by rotating the bolt 38 within back wall 29, it may be adjusted in an axial sense. Thus, adjusted axially outwardly, the bolt frees the bearing block for vertical motion within the support. Axial adjustment inwardly brings the head 39 into frictional contact with the front face of the bearing block and locks the block in a selected vertical position of adjustment.

Effecting a lifting movement of the bearing block 35, and controlling a lowering movement thereof, is an adjustment screw 41 having a threaded mounting in bottom support wall 28. An inner shank end of the bolt 41 projects through wall 28 into space 24 and engages the underside of bearing block 35. A head portion of the screw is accessible from beneath the support, and, it will be evident that rotary motion imparted to the screw 41 effects axial movements thereof translating into lifting and controlling movements relative to the bearing block. Relatively fine adjustments of the screw 41 are possible bringing about relatively fine variations in the depth of undulations 15 as roller 22 is caused more nearly to approach or to separate from roller 21.

Figure 3:
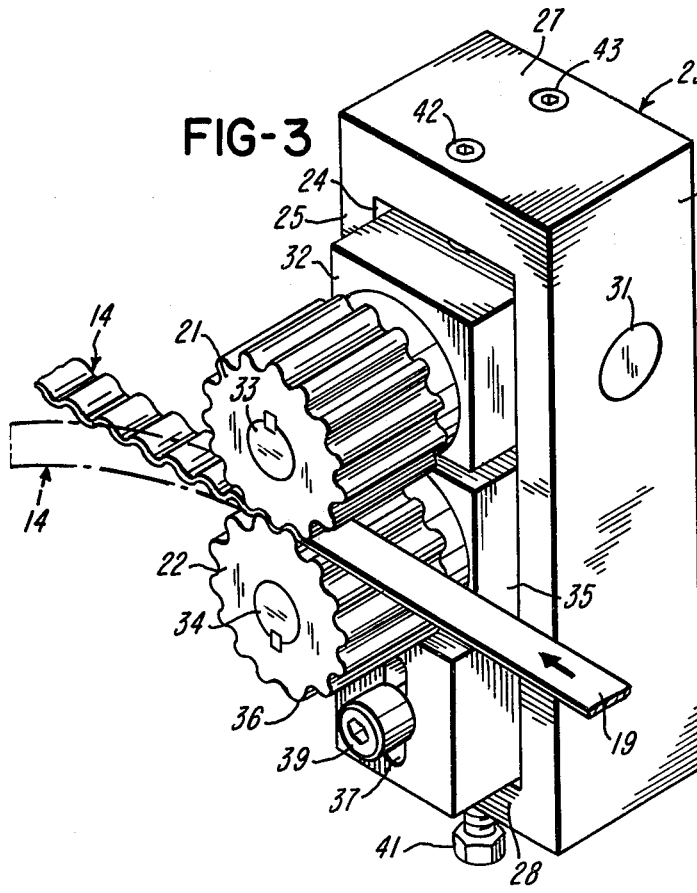
FIG. 3 is a view in perspective of a roller mechanism useful in forming fin material as applied in the embodiments of FIGS. 1 and 2.
Figure 4:
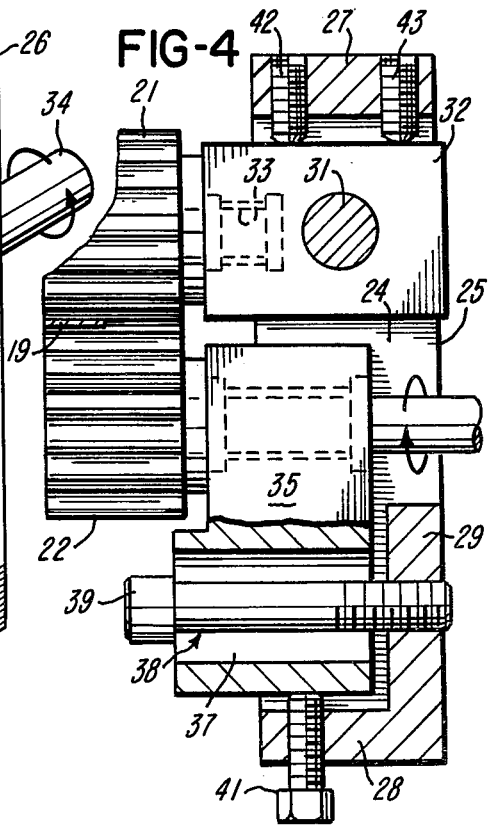
FIG. 4 is a view in longitudinal section of the mechanism of FIG. 3.

A still further control embodied in the roller mechanism is that providing for adjustment in the angular tilting positions of the bearing block 32. In the top support wall 27 are internally threaded apertures accommodating the presence of set screws 42 and 43. These are in a spaced relation to one another on opposite sides of the center line of pivot shaft 31. The screws 42 and 43 project into space 24 and are adpated to engage an upper face of bearing block 32. As so engaged, and by reason of their position to either side of the center line of pivot shaft 31, the screws hold the bearing block against tilting movement about the shaft. Further, and as will be evident, through relative retracting and advancing movements of the screws the bearing block can be caused to move to and to hold angular positions of adjustment different from the one illustrated. Such angular or tilting adjustments of the bearing block are reflected in corresponding angular positions of the roller 21 relatively to underlying roller 22. The teeth of roller 21 accordingly may assume an inclined relation to the teeth of roller 22. As a consequence of this relative positioning of the rollers, undulations 15 as formed in the advancing strip material 19 do not have parallel sides but instead have sides that are in a convergent divergent relation to one another, the undulations being broader at one end than at the other. Incident to and as a result of this manner of deforming the strip, the strip is simultaneously bent about one side edge thereof to assume an arcuate configuration. FIG. 3 hereof illustrates in full lines how fin material is issued from rollers which are in a parallel relation, and illustrates in broken lines a fin material as issuing from rollers which have been tilted out of a parallel relation.

The radius upon which part 11 is formed having been established, the roller 21 is set relatively to roller 22 to enforce a bending of the strip material 19 to produce an undulated strip bent in correspondence with the established radius. Accordingly, as fins of the proper length are cut from the formed strip material they may be applied to the part 11 to have curved inner peripheries thereof seat snugly to the convex surface 12 of the preformed part. Accordingly, fin strips as produced by the roller mechanism are available for mounting on the heat transfer part 11. In accordance with further aspects of the invention, the attaching operation is performed by brazing and in a specially configured braze fixture.

Referring to FIGS. 5 and 6, braze fixtures 44 and 45 are provided respectively useful in producing the articles of FIG. 1 and FIG. 2.

Considering first the fixture of FIG. 5, it comprises upper and lower fixture portions normally separated and brought together preparatory to effecting the actual brazing operation. The lower fixture portion includes a series of cradle-like supports 46 each having an upwardly opening arcuate recess therein formed on a radius corresponding to the radius on which part 11 is formed. Members 46 are interconnected by bars 47 and 48 which provide a fixed, rigid relationship between the cradle members and provide a fixture base. The cradle members 46 cooperate in supporting a reactant plate 49 having a curvature to nest in the cradle recesses. A concave side of plate 49 faces upwardly and mounts arcuately spaced rows of upstanding lugs 51. Corresponding lugs of adjacent rows are aligned with one another and the result is to provide a longitudinal series of transverse slots each of a width to accommodate insertion of a fin 14 therein. The spacing of adjacent lugs is such as to hold a received fin in an upright position with what may be regarded as its outer or convex peripheral edge seated to reactant plate 49. The height of fins 14 is such as to allow them to project upwardly out of accommodating slots. The preformed part 11 then is introduced into the lower fixture, in a position relatively inverted from that shown in FIG. 1. Thus, the convex part surface faces downwardly and is allowed to rest upon the upwardly projected inner peripheral edges of the fins 14.

With the fins 14 and part 11 brought to an assembled relation in the lower fixture, substantially as shown in FIG. 5, the upper fixture portion is applied in a generally closing relation to the lower fixture portion. The upper fixture portion includes a plate 52 so dimensioned as to limit against upper edges of the cradle members 46 when brought to a superimposing relation thereto. Dependent from plate 52 is a segmental cylindrical portion 53 shaped in conformance with the preformed configuration of part 11 so that the cylindrical portion can be effectively nested within the part 11 and uniformly contact the part on its concave side. The upward projection of fins 14 is such that when cylindrical portion 53 of the upper fixture comes to rest within part 11, plate 52 remains elevated from cradle members 46, the parts under these conditions assuming substantially the position illustrated in FIG. 7. As will be understood, the upper fixture portion is made of relatively heavy materials and its entire weight is applied in a pressuring of part 11 into a close, intimate contact with inner peripheral edges of the fins 14, a reactant pressure to outer peripheral edges of the fins being applied by reactant plate 49. The plate 52 has a flat, table-like upper surface and weights may be placed thereon if found necessary or desirable.

With parts assembled and held in the braze fixture, substantially as shown in FIG. 7, a brazing operation is conducted in the course of which the fins 14 are metallurgically bonded along their concave inner edges to the curvilinear exterior of part 11. One manner in which this operation may be conducted is to utilize a part 11 which is made of "braze sheet," that is, a sheet material clad with a braze alloy. The cladding would in this instance be applied to that surface of the sheet material to which fins 14 are to be attached and in the illustrated instance this is the convex part surface which in the braze fixture has a pressured engagement with inner peripheral edges of the fins. A relationship between the part 11 and an abutting fin is illustrated in a partly diagrammatic manner in FIG. 8 where a part 11 is shown as having a cladding 54 of a braze alloy on a surface to which a fin 14 seats. A braze alloy 54 is selected having a melting temperature somewhat less than the melting temperature of either of part 11 or fin 14. Accordingly, when the parts have been assembled and are held as in the manner shown in FIG. 7, if temperatures ambient to the fixture are raised to but not appreciably higher than the melting point of the braze alloy then the alloy will flow and by capillary action penetrate closely fitted surfaces of the joint established by the abutment of the lower fin edge with the mounting surface provided by part 11. When the parts are allowed to cool, soundly brazed joints along the lower peripheral edges of all fins 14 will be found to have occurred. In a single brazing operation, therefore, the multiple fins 14 can be securely bonded to the part 11 to stand rigidly upright therefrom, and by means conducive to a free flow of thermal energy between the fin and its parent or mounting part. FIG. 9 illustrates an attached fin after brazing. For simplified and economical temperature control, the brazing operation can be accomplished by placing an entire assembly as shown in FIG. 7 in a furnace, with the furnace being operated as required to achieve properly indicated temperature levels.

In the instance of FIG. 6, the lower fixture portion includes cradle members 54 similar to cradle members 46 and similarly united by base bars 55. In this instance, however, since the fins are to extend in a sense transversely of the direction of curvature of part 16, cradle members 54 have aligning indentations or recesses 56. Each cradle member has an arcuate series of recesses 56 and in each recess is a pair of bars 57 and 58. The bars 57 and 58 are common to corresponding, aligned recesses and bridge the several cradle member 54. A fin 18 is inserted between each pair of bars 57 and 58 and is held thereby in an upright position, seated to the bottom of a respective recess 56. Part 16 is introduced into the lower fixture portion in a position inverted relatively to that shown in FIG. 2, in the same manner that part 11 is introduced into the lower braze fixture of FIG. 5. There it rests on upstanding edges of the fins 18. Introduction of part 16 is followed by application of an upper fixture portion which is or may be identical to that shown in FIG. 5. The result is the same as that previously described in that the part 16 is urged into close intimate contact with presented inner edges of the fins 18, with the bottoms of recesses 56 applying a reactants pressure to outer fin edges. A brazing operation, like that above discussed, may then be carried out in connection with assembled parts while they are held in pressured interengagement within the fixture. Bars 57 and 58 serve a purpose as spacer members in holding fins 18 in an erect position within recesses 56 and simplify removal of parts from the fixture, after brazing.

The roller mechanism of FIG. 3 illustrates apparatus which can be used either to produce straight fins, useful for example in the embodiment of FIG. 2, or bent fins, useful for example in the embodiment of FIG. 1. Fins may be otherwise formed to a bent configuration, as for example in the manner diagrammatically illustrated in FIG. 10. Here, a form 59 is provided, an upper surface 61 of which has a curvature matching the convex curvature of a part 11 to which fins are to be attached. A fin 14, after having been put through the roller mechanism of FIG. 3, or the like, is brought to the form 59 and placed on edge thereon. Following this, a downward pressure is exerted upon the fin causing its lower edge to approach and to contact surface 61. The applied deforming pressure is accommodated within the undulations 15 which expand at their upper ends and are relatively compressed at their lower ends to assume as a result an approximately frusto-conical configuration as shown in FIG. 11. The undulations 15 accordingly have a dual function in accordance with invention aspects. They induce a turbulence in fluid flow, as before discussed, and, in addition, provide recessed and indented material within the fin by which portions of the fin may be effectively stretched and compressed to accomplish bending of its upper and lower edges as described.

Various invention embodiments have been illustrated and discussed herein. It is to be understood that these and other forms of the invention that may suggest themselves to persons skilled in the art, having the present disclosure before them, are regarded as being within the invention concept.

I claim:

1. A method of producing extended surface fin-like material and attaching it to a heat transfer or like surface to project substantially perpendicularly thereof, including the steps of providing a planar strip of a material capable of assuming and maintaining bent configurations, deforming said strip including a step giving the strip an undulating configuration, formed undulations orienting in a sense generally perpendicular to a side edge of the strip and having sides that are in a convergent-divergent relation to one another, applying said strip to a heat transfer or like mounting surface so that said side edge thereof seats to said mounting surface, holding said strip in an applied position in which it stands on edge on said mounting surface with said undulations therein projecting substantially vertically of said mounting surface, applying a substantially uniform pressure to an opposite side edge of said strip, simultaneously over the length thereof to urge the first said side edge thereof into close intimate contact with said mounting surface, and while said strip continues to be so held and so pressured, metallurgically bonding it to said mounting surface along the first said side edge.

2. A method according to claim 1, wherein a plurality of disconnected strips are deformed and applied to said mounting surface in a spaced substantially parallel relation, said strips being conjointly held and pressured for bonding and being all bonded to said mounting surface in a single bonding operation.

3. A method according to claim 1, wherein said heat transfer or like mounting surface describes a segment of a cylinder, said strip being applied to said mounting surface with the said one edge thereof orienting in a sense parallel to the direction of curvature of said mounting surface, the deforming of said strip further including a bending of the strip so that it assumes a curvature about an axis perpendicular to the plane of the strip with the one said side edge of the strip forming an inner peripheral edge of the formed strip, stresses applied in the bending of said strip being accommodated in said undulations therein.

4. A method according to claim 1, wherein said heat transfer or like mounting surface is curvilinear and the said one edge of said strip is arcuately configured in correspondence with the curvature of said surface to seat thereto in a conforming relation, the arcuate configuration of the said one edge being achieved by bending said strip about an axis perpendicular to the plane thereof, stresses applied in the bending of said strip being accommodated in said undulations therein.

5. A method according to claim 4, wherein multiple formed strips are applied to said mounting surface in a parallel separated relation to one another, the said holding step utilizing a lower fixture portion providing upwardly opening multiple curved slots in a spaced parallel relation to one another, each slot receiving a formed strip in which the arcuately configured said one edge projects upwardly out of an accommodating slot and the said opposite side edge of said strip engages the bottom of the slot, a part providing said curvilinear surface being received in said fixture with the said curvilinear surface thereof bearing on the said one edges of said strips, and the step of applying pressure to opposite side edge of said strip utilizing an upper fixture portion applying a dynamic pressure through said part to all of the first said side edges of said strips at the same time, reactant pressure at the bottoms of said slots exerting the said applied pressure simultaneously to the said opposite side edges of said strips, said upper fixture portion being removed at the conclusion of the bonding step and said part with strips bonded thereto being removable from said lower fixture portion.

6. A method according to claim 5, wherein said strips and said part are made of brazeable metals, said curvilinear surface of said part being clad with a braze alloy, the metallurgical bonding of said strip to said part being carried out while said part is held in a pressured engagement with said strips in said fixture portions by heating the comprised assembly to a temperature reaching the melting temperature of the braze alloy but which is less than the melting temperature of the parent metals, and allowing the assembly to cool from said temperature.

7. A method according to claim 6, wherein said part is clad with a braze alloy on one side only, a side contacted by said upper fixture portion in applying a dynamic pressure being unclad.

8. A method of producing extended surface fin-like material and attaching it to a heat transfer or like surface to project substantially perpendicularly thereof, including the steps of providing at least one planar strip of a material capable of assuming and maintaining bent configurations, deforming said strip including a step giving the strip an undulating configuration, the deforming of said strip to produce said undulations therein being a step utilizing mating rollers between which the strip is fed in a sense lengthwise thereof, one of said rollers being tiltably adjustable relative to the other to achieve a bending of the strip about an axis perpendicular to the plane thereof as an operation incident to and as a part of the same operation by which undulations are formed therein, said step including a tilting adjusting of said one roller for a selective bending of the strip, applying said strip to a heat transfer or like mounting surface so that a side edge thereof seats to said mounting surface, holding said strip in an applied position in which it stands on edge on said mounting surface with said undulations therein projecting substantially vertically of said mounting surface, applying a substantially uniform pressure to an opposite side edge of said strip, simultaneously over the length thereof to urge the first said side edge thereof into close intimate contact with said mounting surface, and while said strip continues to be so held and so pressured, metallurgically bonding it to said mounting surface along said side edge, said heat transfer or like mounting surface being curvilinear and the said one side edge of said strip being arcuately configured in correspondence with the curvature of said surface to seat thereto in a conforming relation.

9. A method of producing extended surface fin-like material and attaching it to a heat transfer or like surface to project substantially perpendicularly thereof, including the steps of providing multiple planar strips of a material capable of assuming and maintaining bent configurations, deforming each of said strips including a step giving the strip an undulating configuration, formed undulations orienting in a sense generally perpendicular to a side edge of the strip, applying said strips to a heat transfer or like mounting surface so that said side edges thereof seat to said mounting surface, said heat transfer or mounting surface being curvilinear and the said one edge of each said strips being arcuately configured in correspondence with the curvature of said surface to seat thereto in a conforming relation, the arcuate configuration of the said one edge being achieved by bending said strip about an axis perpendicular to the plane thereof, stresses applied in the bending of said strip being accommodated in said undulations therein, utilizing a lower fixture portion providing upwardly opening multiple curved slots in a spaced parallel relation to one another to hold said strips, each slot receiving a formed strip in which the arcuately configured said one edge projects upwardly out of an accommodating slot and an opposite side edge of said strip engaging the bottom of the slot, a part providing said curvilinear surface being received in said fixture with the said curvilinear surface thereof bearing on the said one edges of said strips, utilizing an upper fixture portion to apply a dynamic pressure through said part to all of the first said side edges of said strips at the same time, reactant pressure at the bottoms of said slots exerting the said applied pressure simultaneously to the said opposite side edges of said strips, and while said strips continue to be so held and so pressured, metallurgically bonding them to said mounting surface along the first said side edges thereof, said upper fixture portion being removed at the conclusion of the bonding step and said part with strips bonded thereto being removable from said lower fixture portion.

10. A method of producing extended surface fin-like material and attaching it to a heat transfer or like surface curved in at least one sense to project substantially perpendicularly thereof, including the steps of providing a plurality of disconnected fins made of a strip-like deformable material and adapted to stand on edge on said surface to project outwardly therefrom, each of said fins being deformed by bending about an axis perpendicular to the fin plane to give opposite side edges thereof concave and convex configurations respectively allowing it to conform to and uniformly to contact a convex surface, holding said fins in a substantially parallel spaced apart relation to one another, bringing the held fins and said heat transfer surface to a cooperative relation in which said fins contact said surface along one of their opposite side edges, applying uniform dynamic and reactant pressures to said fins causing said contacting side edges thereto to seat closely to said surface, and while said pressures continue to be applied bonding said fins to said surface.

11. A method according to claim 10, including the step of further deforming said fins by providing undulations therein perpendicular to opposite side edges thereof, adjacent fins positioning so that undulations therein cooperate in inducing turbulence in a fluid flow over said surface.

12. A method according to claim 11, wherein sides of said undulations present convergent-divergent configurations.

13. A method according to claim 12, wherein the deforming of said strip to produce undulations therein is a step utilizing mating rollers between which the strip is fed in a sense lengthwise thereof, one of said roller being tiltably adjustable relative to the other to achieve a bending of the strip about an axis perpendicular to the plane thereof as an operation incident to and as a part of the same operation by which undulations are formed therein, said step including a tilting adjustment of said one roller for a selective bending of the strip.

* * * * *